US009181395B2

(12) United States Patent
Kalayaraman et al.

(10) Patent No.: US 9,181,395 B2
(45) Date of Patent: Nov. 10, 2015

(54) OPTIMIZED EMULSION DRYING PROCESS FOR MAKING MICRONIZED POLYETHERIMIDE POLYMERS

(71) Applicant: SABIC INNOVATIVE PLASTICS IP B.V., Bergen op Zoom (NE)

(72) Inventors: Viswanathan Kalayaraman, Mt. Vernon, IN (US); Donald Owens, Mt. Vernon, IN (US); Norman Johnson, Mt. Vernon, IN (US); Albert Stella, Schenectady, NY (US); David Woodruff, Schenectady, NY (US); Paul Howson, Schenectady, NY (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 106 days.

(21) Appl. No.: 13/841,802

(22) Filed: Mar. 15, 2013

(65) Prior Publication Data
US 2014/0275365 A1  Sep. 18, 2014

(51) Int. Cl.
C08L 51/04 (2006.01)
C08K 3/32 (2006.01)
C08G 73/10 (2006.01)
C08K 5/49 (2006.01)
C08J 3/14 (2006.01)

(52) U.S. Cl.
CPC .................. *C08G 73/105* (2013.01); *C08J 3/14* (2013.01); *C08K 3/32* (2013.01); *C08K 5/49* (2013.01); *C08J 2379/08* (2013.01); *Y10T 428/2982* (2015.01)

(58) Field of Classification Search
USPC .......................................................... 524/115
See application file for complete search history.

(56) References Cited

U.S. PATENT DOCUMENTS

| 4,668,768 | A | 5/1987 | Mendiratta et al. |
| 6,001,957 | A | 12/1999 | Puyenbroek et al. |
| 2002/0045725 | A1 | 4/2002 | Vodermayer et al. |
| 2010/0305239 | A1 | 12/2010 | Wei et al. |
| 2011/0070442 | A1 | 3/2011 | Asano et al. |
| 2011/0300381 | A1 | 12/2011 | Bergerat et al. |
| 2012/0245239 | A1 | 9/2012 | Kalyanaraman et al. |

FOREIGN PATENT DOCUMENTS

WO  WO2012071013 A1  5/2012

OTHER PUBLICATIONS

Written Opinion of the International Searching Authority; Mailed Jul. 7, 2014.
Iinternational Searching Authority; Mailed Jul. 2, 2014.

*Primary Examiner* — Ling Choi
*Assistant Examiner* — Thuy-Al Nguyen
(74) *Attorney, Agent, or Firm* — Novak Druce Connolly Bove + Quigg LLP

(57) ABSTRACT

A process for making ultra-fine particles of a high performance polymer in a yield greater than 90%, which includes dissolving the high performance polymer in an organic solvent capable of dissolving the polymer to form a solution; emulsifying the solution by combining the solution with water and a surfactant to form an emulsion; transferring the emulsion into a receiving water containing a surfactant to remove the organic solvent and form a slurry; and recovering particles of less than 75 microns in diameter in a yield greater than 90%.

30 Claims, 2 Drawing Sheets

OPTIMIZED EMULSION DRYING PROCESS FOR MAKING MICRONIZED POLYETHERIMIDE POLYMERS

BACKGROUND OF THE INVENTION

1. Field of the Invention

The invention relates generally to a process for making ultra-fine particles of a high performance polymer; and more specifically to a process for making ultra-fine spherical particles of a high performance polymer in a yield greater than 90%.

2. Description of the Related Art

High performance polymers such as polyetherimide can be made into ultra-fine powders (i.e. having a diameter of less than or equal to 75-microns) by emulsifying the polymer in an organic solvent, and further removing the organic solvent from the emulsion through distillation. Information relevant to such methods can be found in U.S. Pat. No. 6,528,611. However, particles made by such an emulsion distillation process can result in a poor yield of ultra-fine particles. In particular, the yield of ultra-fine particles can be less than 90%. Therefore, there is a need for an optimized process for a higher yield for commercial feasibility.

BRIEF SUMMARY OF THE INVENTION

The present invention relates to a process for the manufacture of ultra-fine particles of a high performance polymer in a yield greater than 90%. The process can include: dissolving the high performance polymer in an organic solvent capable of dissolving the polymer to form a solution; emulsifying the solution by combining the solution with water and a surfactant to form an emulsion; transferring the emulsion into a receiving water containing a surfactant to remove the organic solvent and form a slurry; and recovering particles of less than 75 microns in diameter in a yield greater than 90%. According to various embodiments, the high performance polymer can be a polyetherimide; the solvent can be methylene chloride; and the surfactant can be sodium dodecyl benzene sulfonate (SDBS).

BRIEF DESCRIPTION OF THE DRAWINGS

These and other features, aspects, and advantages of the present invention will become better understood with reference to the following description and appended claims, and accompanying drawings where:

Figure 1:
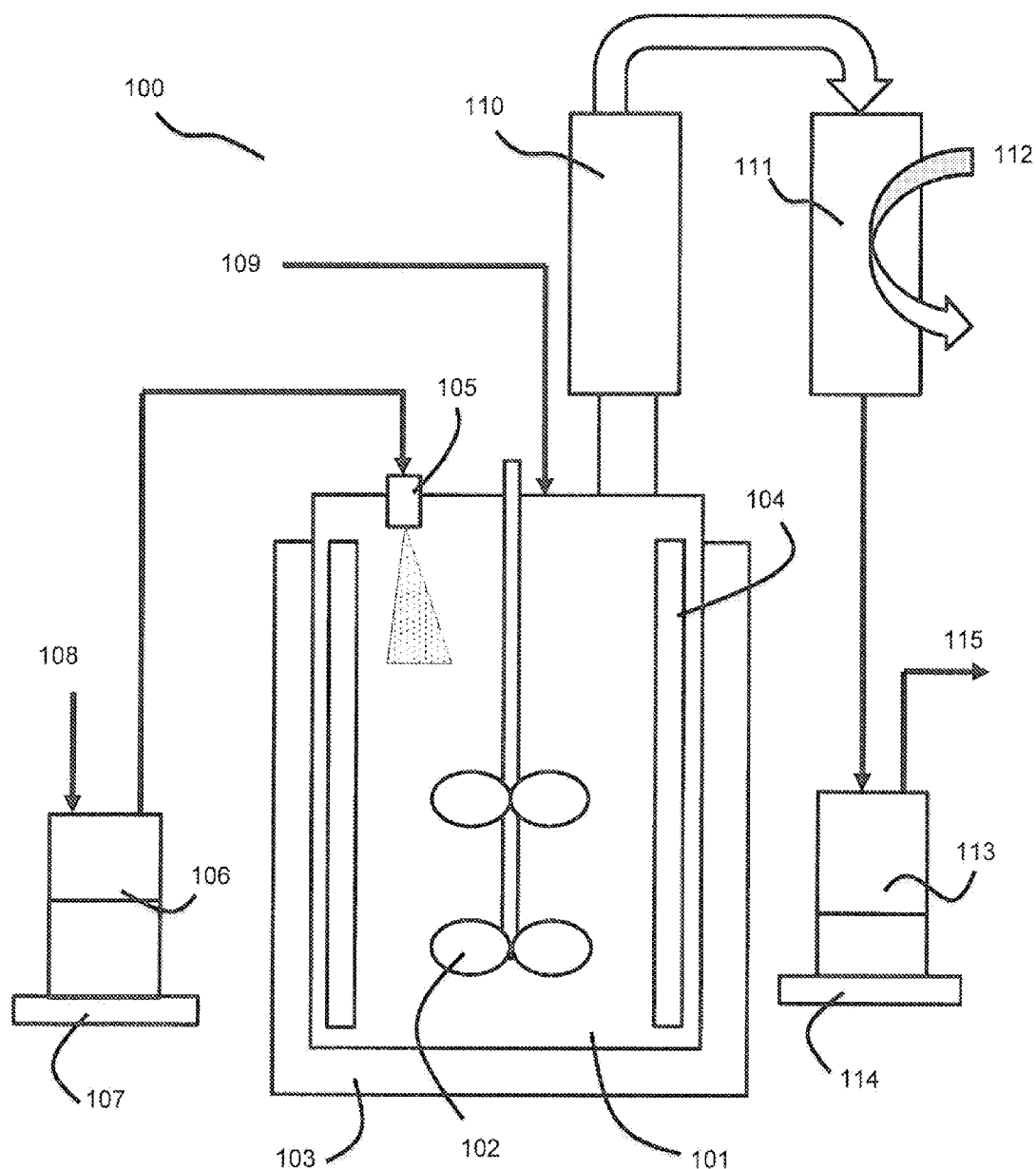
FIG. 1: is a schematic diagram of the emulsion spray drying process.

It should be understood that the various embodiments are not limited to the arrangements and instrumentality shown in the drawings.

DETAILED DESCRIPTION OF THE INVENTION

This innovative process involves transferring a polymer emulsion in a controlled fashion into de-ionized water, maintained at greater than 70 degrees Celsius, and removing the organic solvent by condensation. It was discovered that when the de-ionized water (referred to as "receiving water" hereafter) does not contain any surfactant, the process produces less than 90% yield of particles having a diameter of less than or equal to 75 microns. On the other hand, when the "receiving water" contains surfactant, the yield of particles having a diameter of less than or equal to 75 microns unexpectedly increases. The maximum yield of particles having a diameter of less than or equal to 75 microns was found to occur when the ratio of water to surfactant in the emulsion matches with ratio of water to surfactant in the "receiving water".

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

As used herein, the term "ultra-fine particles" refers to particles having a particle size of less than or equal to 75 microns.

As used herein, the term "high performance polymer" refers to polyimides, polyetherimides, polysulfones, polyethersulfones, polyphenylenesulfones, polyamideimides, polycarbonates, polycarbonate co-polymers, polyphenylene ethers, polyphenylene oxides, polyamides, polyaryletherketones, and polyarylketones.

Various embodiments relate to a process of forming ultra-fine particles of a polyetherimide (PEI) polymer in a yield greater than 90%. The process can include dissolving a polyetherimide (PEI) polymer in methylene chloride to form a solution. The solution can be emulsified by combining the solution with de-ionized water and a surfactant under agitation conditions sufficient to form an emulsion. The de-ionized water can be maintained at, a temperature within a range having a lower limit and/or an upper limit. The range can include or exclude the lower limit and/or the upper limit. The lower limit and/or upper limit can be selected from 60, 65, 70, 75, 80, 85, 90, 95, 100, 105, 110, 115, 120, 125, 130, 135, 140, 145, 150, 155, 160, 165, 170, 175, 180, 185, 190, 195, and 200 degrees Celsius. For example, according to certain preferred embodiments, the de-ionized water can be maintained at a temperature of greater than 70 degrees Celsius. A defoaming agent can be added to the emulsion. Next, the emulsion can be transferred into receiving water. According to various embodiments the emulsion can be transferred drop wise into the receiving water. The emulsion can also be transferred through a nozzle into the receiving water. The receiving water can be de-ionized. The receiving water can also contain a surfactant, such as sodium dodecyl benzene sulfonate (SOBS). After the emulsion is transferred into the receiving water, the process can include removing the methylene chloride to form a slurry. The slurry can then be filtered to form a filtrate. The filtrate can be washed with de-ionized water one or more times. The washed filtrate can be dried under vacuum. Finally, particles of polyetherimide (PEI) can be recovered.

Methylene chloride is used as a solvent for making polyetherimides (polyetherimide homopolymers and polyetherimide copolymers) and other specific type of solvents can also be used. Generally, solvents suitable for this invention must have the combination of the following features. The polyetherimide, for instance, must be soluble in the solvent. Also, the solvent should have a boiling point that is less than 100 degrees Celsius. The solvent should be immiscible with water. An example of other suitable solvents (besides methylene chloride) is chloroform and dichloroethane.

Surfactants that are suitable for the invention can include anionic, cationic, zwitter ionic or non-ionic surfactants. In one embodiment, the surfactant is sodium dodecyl benzene sulfonate. In another embodiment and sodium dodecyl sulfate, as indicated above. Combinations of sodium dodecyl benzene sulfonate and sodium dodecyl sulfate can also be used. Some examples of anionic surfactants are ammonium lauryl sulfate, sodium lauryl ether sulfate (SLES), sodium myreth sulfate, dioctyl sodium sulfosuccinate, perfluorooctanesulfonate (PFOS), perfluorobutanesulfonate, and linear alkylbenzene sulfonates (LABS).

The particles can have a diameter within a range having a lower limit and/or an upper limit. The range can include or exclude the lower limit and/or the upper limit. The lower limit and/or upper limit can be selected from 0.01, 0.1, 0.5, 1, 2, 3, 4, 5, 10, 15, 20, 25, 30, 35, 40, 45, 50, 55, 60, 65, 70, 75, 80, 85, 90, 95, and 100 microns. For example, according to certain preferred embodiments, the particles can have a diameter of less than or equal to 75 microns.

The particles can be recovered in a yield within a range having a lower limit and/or an upper limit. The range can include or exclude the lower limit and/or the upper limit. The lower limit and/or upper limit can be selected from 90, 90.25, 90.5, 90.75, 91, 91.25, 91.5, 91.75, 92, 92.25, 92.5, 92.75, 93, 93.25, 93.5, 93.75, 94, 94.25, 94.5, 94.75, 95, 95.25, 95.5, 95.75, 96, 96.25, 96.5, 96.75, 97, 97.25, 97.5, 97.75, 98, 98.25, 98.5, 98.75, 99, 99.25, 99.5, and 99.75%. For example, according to certain preferred embodiments, the particles can be recovered in a yield of from about 94% to about 99%. The process can further include matching the amount of surfactant in the receiving water to the amount of the surfactant in the emulsion. The step of matching can raise the yield of particles within a range having a lower limit and/or an upper limit. The range can include or exclude the lower limit and/or the upper limit. The lower limit and/or upper limit can be selected from 98, 98.1, 98.2, 98.3, 98.4, 98.5, 98.6, 98.7, 98.8, 98.9, 99, 99.1, 99.2, 99.3, 99.4, 99.5, 99.6, 99.7, 99.8, and 99.9%. For example, according to certain preferred embodiments, the step of matching can raise the yield of particles to above 98%.

The invention is further described in the following illustrative examples in which all parts and percentages are by weight unless otherwise indicated.

EXAMPLES

In order to demonstrate the innovative process of the present invention, high performance polymers, such as polyetherimides ("PEI"), can be made into ultrafine powders (<75-microns in diameter, in high yield) by emulsifying the polymer in organic solvent-water-surfactant mixture, and transferring the polymer emulsion in a controlled fashion into de-ionized water (maintained >70 degrees Celsius), and removing the organic solvent by condensation. It was discovered that when the de-ionized water (referred to herein as "receiving water") does not contain any surfactant, the process produces <75-micron particles with a poor yield of about 70%, or less. When the "receiving water" contains a surfactant, the yield of <75-micron particles unexpectedly increases over 90%. However, it was further unexpectedly discovered that when the ratio of water to surfactant in the emulsion matches with the ratio of water to surfactant in the "receiving water", a maximum yield of <75-micron particles is achieved.

In all cases, the process of the invention is an improvement over the state of the art process as described in U.S. Pat. No. 6,528,611 (incorporated herein by reference) in which a PEI polymer was emulsified in an organic solvent-water-surfactant mixture and the solvent removed by from the emulsion through distillation. Although PEI particles of <75-micron could be obtained, the yield of such particles is <90%.

FIG. 1 is a schematic diagram of the emulsion spray drying process. The process can include a reactor 101, having an agitator 102, a heating jacket 103 and cooling rings 104. An emulsion can be sprayed into the reactor 109 via a spray nozzle 105 from a stirred emulsion tank 106, supported on a weigh scale 107. A stream 108 of $N_2$ can be added to the stirred emulsion tank 106. The emulsion can be heated to 50 degrees Celsius under 50 psi pressure in the stirred emulsion tank 106 and transferred into the heated reactor 101 where the dichloromethane solvent can be flashed off, passed through a partial condenser 110 and a full condenser 111 supplied with chilled water 112 to a condensate tank 113. The condensate tank 113 can be supported on a weigh scale 114 and can be supplied with a $N_2$-vent 115.

Description and Operation

The thermoplastic polymer (UItem* 1000 resin) was dissolved in an organic solvent like Methylene Chloride (to produce the polymer solution) and emulsified with DI water and surfactant. Emulsification was done with high shear agitation (2500 rpm or above), which resulted in stable emulsion formation. The emulsion is slowly added into another reactor which contains DI water maintained >70 degrees Celsius. According to this invention, the "receiving water" can contain surfactant. The addition of emulsion into "receiving water" can be drop wise or through a nozzle (for production of fine droplets). The emulsion vessel can be pressurized and heated, if needed. Optionally, anti-foaming agents can be added to the "receiving water" to minimize the foam during addition of emulsion. Once all the organic solvent is removed, the aqueous slurry was then filtered through a 75-micron sieve, filtered through a 2-micron filter, washed with DI water thrice and dried at 180° C. under vacuum. The yield of the process was calculated using the initial polymer weight and <75-micron particle weight.

(A) Preparation of Polymer Aqueous Dispersion:

50 grams of UItem 1000 resin was dissolved in 200 grams of Methylene Chloride to form a 20% \NAN polymer solution. 200 grams of de-ionized (hereinafter "DI") water was added to this polymer solution along with 0.42 grams of Sodium Dodecyl Benzene Sultanate (SOBS) surfactant (2100 ppm of SDBS based on DI water weight). The resulting mixture was emulsified using a hand held high shear mixer at 10,000 rpm for two minutes. This resulted in a stable emulsion. Due to light scattering, the emulsion appears to be "milky" in color.

(B) Removal of Organic Solvent by Dropping into Hot Water:

The above prepared emulsion was transferred drop by drop into another glass vessel containing 200 grams of DI water which was maintained around 80 degrees Celsius. Both the emulsion vessel and receiving water vessel were agitated using magnetic stirrer. The Methylene Chloride was condensed using cold-water circulated condenser. Once all the Methylene Chloride is removed, the aqueous slurry was filtered through a 75-micron sieve. The aqueous slurry is then filtered using a 2-micron filter, washed thrice with DI water and dried at 180 degrees Celsius under vacuum. The ultra-fine polymer powder was weighed to calculate the process yield. Results of Comparative Examples 1-2 and Inventive Examples 3-10 as Tabulated in Table 1

Yield of <75-micron polymer particles with respect to surfactant and anti-foam amounts in the "receiving water". The emulsion contained 2100 ppm of surfactant (based on DI water). The "receiving water" was maintained at 80 degrees Celsius with constant stirring. The emulsion that was maintained at room temperature was transferred drop by drop into the "receiving water" using a peristaltic pump.

TABLE 1

| Example # | SDBS in emulsion, ppm (With respect to DI water) | SDBS in "receiving water", ppm | Anti-Foam Level in "receiving water", ppm | <micron particle yield (%) |
|---|---|---|---|---|
| 1 (Comparative) | 2100 | 0 | 0 | 68.3 |
| 2 (Comparative) | 2100 | 0 | 150 | 14.0 |
| 3 | 2100 | 210 | 150 | 94.1 |
| 4 | 2100 | 525 | 150 | 96.7 |
| 5 | 2100 | 1050 | 150 | 97.3 |
| 6 | 2100 | 1575 | 150 | 97.6 |
| 7 | 2100 | 2100 | 150 | 99.0 |
| 8 | 2100 | 3150 | 150 | 95.7 |
| 9 | 2100 | 3150 | 150 | 95.8 |
| 10 | 2100 | 2100 | 0 | 98.9 |

Discussion

It can be seen from Table 1, that when the "receiving water" did not contain SOBS surfactant (Comparative Examples #1 and 2), the yield of the process (production of <75-micron particles) was <70%, substantially below the at least 90% that are obtained with the present invention. When the "receiving water" contained SOBS surfactant (Examples #3 to 10), the yield of the process (production of <75-micron particles) was >94%. Interestingly, the presence or absence of anti-foam agents present in the "receiving water" did not significantly affect the yield of the process (Example 7 versus 10). Surprisingly, when the SOBS surfactant in "receiving water" matched the SOBS surfactant level in the emulsion (in this case in Example #7, it was 2100 ppm), maximum process yield (production of <75-micron particles) was achieved.

SUMMARY

Polymer emulsions were made using polymer, organic solvent, water and surfactant. The polymer solution was transferred into hot water ("receiving water") to remove the organic solvent, which produces <75-micron particles. It was found that process yield unexpectedly increases when the "receiving water" contains surfactant and maximum process yield was unexpectedly achieved with the surfactant levels in the "receiving water" and emulsion were matched to each other.

Examples 11-14

The purpose of Examples 11-14 was to make micronized polyetherimide powders according to our invention at a relatively larger scale than as shown in Examples 1-10. Examples 11-12 show the powders being made in a pilot plant facility while Examples 1314 show the powders being made in a manufacturing plant.

Examples 11-12

For Examples 11-12, an emulsion was made by dissolving polyetherimide polymer (Ultem 1000 resin) in an organic solvent (dichloro methane aka methylene chloride) capable of dissolving the polymer to form a solution and a solution was formed. The solution was emulsified by combining the solution with water and a surfactant (SDBS surfactant) to form an emulsion. The emulsification was made by Silverson 150LB038, with a ¹⁄₁₆" (1.6 mm) screen at a stator rotational speed of 3600 RPM. The emulsion was then transferred into a receptacle with receiving water containing a surfactant and the organic solvent was removed, thereby forming slurry. Once the slurry formed, particles having <75-micron diameter were recovered. The formulation that was used to make the emulsion containing the powders is shown in Table 2.

TABLE 2

| Ultem 1000 Pellets, KG | 18.75 |
|---|---|
| Dichloromethane, KG | 74.9775 |
| DI Water, KG | 75 |
| SDBS surfactant, 100% solid, Grams | 157.5 |
| SDBS/Ultem, grams/KG | 8.4 |
| SDBS/DCM, grams/KG | 2.10063 |
| Ultem/DCM, KG/KG | 0.250075 |
| DCM/DI Water, KG/KG | 0.9997 |
| Total Mass, KG | 168.885 |
| Total Volume (approximate), Gal | 35.05284 |

The above formed emulsion was taken in a 50 gal reactor and pressurized by nitrogen to 50 psi. The emulsion was heated to 50 degrees Celsius with constant stirring. The superheated emulsion was transferred through a PVDF nozzle or a PVDF tube to another 300 gal reactor which contained 50 gallons of DI water at 80 degrees Celsius. The DI water also contained 2100 ppm of SIBS surfactant and 75 ppm of anti-foam (Dow Corning 1520). The flashing DCM was then removed from the reactor headspace through a condenser system. Nitrogen flow in the headspace was used to enhance the removal of the DCM. A partial condenser was used above the reactor to condense water vapor back to the reactor while allowing for removal of DCM. This partial condenser temperature should be higher than the boiling point of DCM at the pressure, but lower than the water boiling point so that water losses are minimized. The full condenser then condenses the DCM and the amount is collected as a function of time and monitored to insure the amount of inlet and outlet DCM flow rates match. The nitrogen that is used as a sweep is then vented. The results for Examples 11-12 are summarized in Table 3.

TABLE 3

| | Example 11 | Example 12 |
|---|---|---|
| Nozzle Type | PVDF | PVDF |
| Nozzle Aperture (in) | 0.02 | 0.25 |
| Average Spray Rate (GPH) | 3.28 | 17.5 |
| Spray Time (min) | 90 | 78 |
| Emulsion Sprayed (KG) | 23.67 | 109.4 |
| % Yield of <75 micron particles | 98.9 | 97.3 |

Discussion of Examples 11-12

The results of Examples 11 and 12 show that it was possible to make ultra-fine particles of a high performance polymer in a yield greater than 90%

Examples 13-14

For Examples 13-14, an emulsion was made by dissolving polyetherimide polymer (Ultem 1000 resin) in an organic solvent (dichloro methane (aka methylene chloride) capable of dissolving the polymer to form a solution and a solution was formed. The solution was emulsified by combining the solution with water and a surfactant (SOBS surfactant) to form an emulsion. The emulsification was performed in a Silverson400LS with a ¹⁄₁₆" (1.6 mm) screen at a stator rotational speed of 3600 RPM and a turnover of 50 GPM. The emulsion was then transferred into a receptacle with receiving water containing a surfactant and the organic solvent was removed, thereby forming slurry. Once the slurry formed, particles having <75-micron diameter were recovered.

Emulsion Preparation Techniques

TABLE 4

| | |
|---|---:|
| Ultem 1000 Pellets, KG | 673.58 |
| Dichloromethane, KG | 2691.16 |
| DI Water, KG | 2705.22 |
| SDBS surfactant, 40% solution, KG | 14.51 |
| Total Mass, KG | 6084.47 |

Spray Isolation

The above formed emulsion was taken in a 1500 gal reactor and pressurized by nitrogen to 50 psi. The emulsion was heated to 50 degrees Celsius with constant stirring. The superheated emulsion was transferred through a PVDF tube (0.25"diameter) to another 3000 gal reactor which contained 500 gallons of DI water at 80 degrees Celsius. The DI water also contained 2100 ppm of SDBS surfactant and 75 ppm of anti-foam (Dow Corning 1520). The flashing DCM was then removed from the reactor headspace through a condenser system. Nitrogen flow in the headspace was used to enhance the removal of the DCM. A partial condenser was used above the reactor to condense water vapor back to the reactor while allowing for removal of DCM. This partial condenser temperature should be higher than the boiling point of DCM at the pressure, but lower than the water boiling point so that water losses are minimized. The full condenser then condenses the DCM and the amount is collected as a function of time and monitored to insure the amount of inlet and outlet DCM flow rates match. The nitrogen that is used as a sweep is then vented.

Filtration

After spray isolation the resulting powder slurry in water was then filtered and washed using a 100 gallon capacity centrifuge equipped with an appropriately sized polypropylene mesh filter cloth. Additionally a course bag filter was also placed in line before the centrifuge to remove any very large macro sized particles or contaminates in the process prior to reaching the centrifuge. After filling, the centrifuge and dewatering the wet cake, the wet cake was then washed in place with DI water delivered via spray heads inside the centrifuge. This process was repeated until the cake was adequately washed and determined to be in specification based on wash water conductivity analysis. This wet cake, which was typically between 70-80% solids, was then removed from the centrifuged and transferred to a dryer.

Drying

The resulting wet cake material was then dried in an agitated 2000 gallon Processall paddle drier under heat and vacuum until the powder achieved a residual moisture content of less than 0.5%. The Processall was equipped with an overheads bag house with pulse back nitrogen pressure to minimize bag house plugging and a small nitrogen sweep was used to ensure an inert atmosphere during drying. This final dried free flowing powder was then removed and packaged as a final product.

Results

The results of our experiments for Examples 13-14 are shown below.

TABLE 5

| | Example 13 | Example 14 |
|---|---|---|
| Nozzle Type | PVDF | PVDF |
| Nozzle Aperture (in) | 0.25 | 0.25 |
| Average Spray Rate (GPH) | 54 | 54 |
| Spray Time (hrs) | 27 | 27 |
| Emulsion Sprayed (KG) | 6084.47 | 6084.47 |
| % Yield of <75 micron particles | 98.17 | 93.14 |
| Properties of dried powder: | | |
| Na (PPM) | 2.7 | 3 |
| K (PPM) | 4.9 | 5.2 |
| Si (PPM) | 19.2 | 9.4 |
| Ca (PPM) | 17.9 | 13.9 |
| Iron (PPM) | 20.4 | 8.2 |
| DCM (PPM) | 5 | 9.9 |
| D90 (μm), based on volume | 19.35 | 17.83 |

Discussion of Examples 13-14

Our results show that it was possible to make ultra-fine particles of a high performance polymer in a yield greater than 90%. It can be also seen that the dried ultra-fine particles have low residual metal content as well as low residual solvent content.

Figure 2:
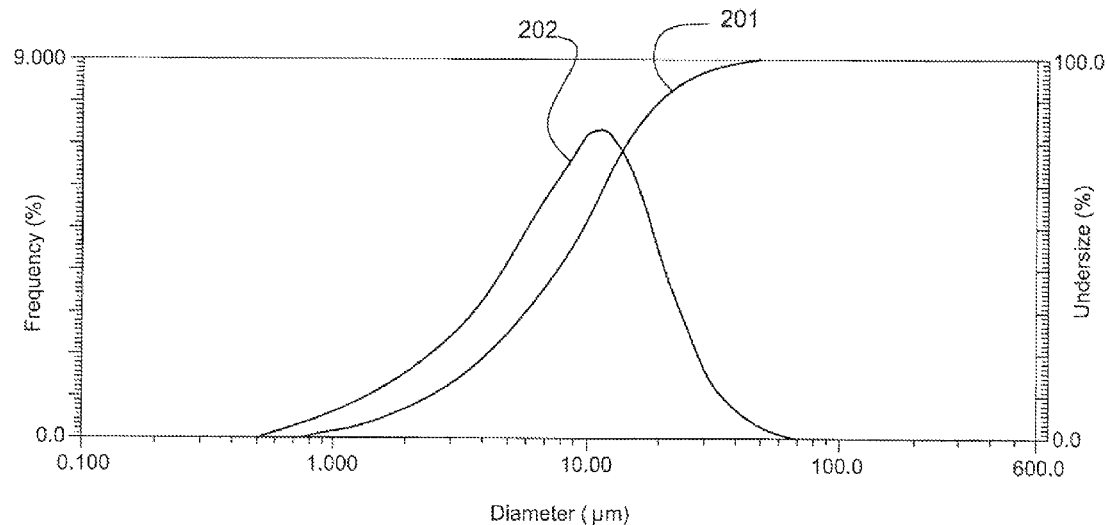
FIG. 2: is a chart showing the particle size distribution by laser scattering for Example 13.
Figure 3:
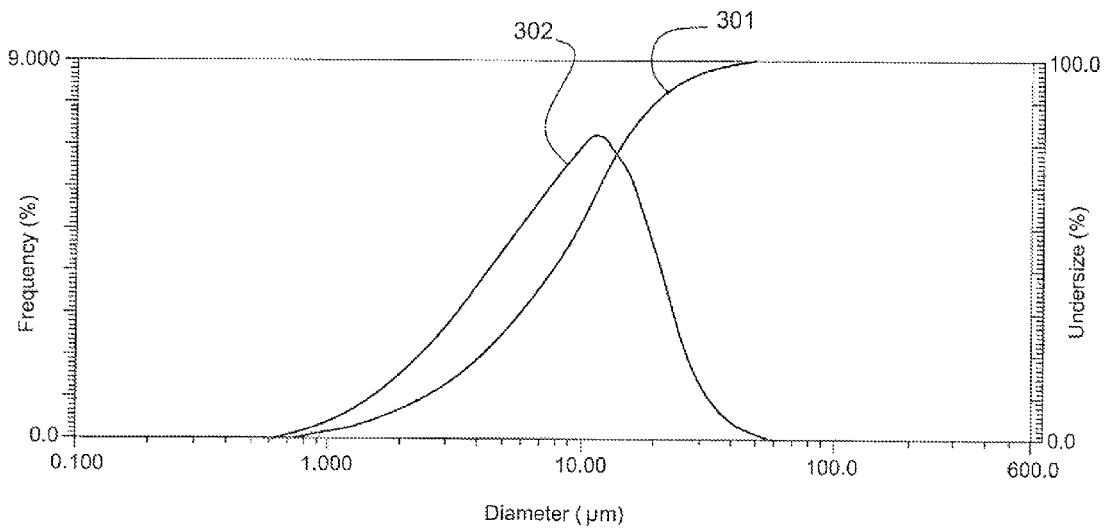
FIG. 3: is a chart showing the particle size distribution by laser scattering for Example 14.

FIG. 2 is a chart showing the particle size distribution by laser scattering for Example 13. The d90 (based on volume) is 19.35 microns. Curve 201 is cumulative distribution (% passing), based on volume. Curve 202 is frequency distribution %, based on volume. FIG. 3 is a chart showing the particle size distribution by laser scattering for Example 14. The d90 (based on volume) is 17.83 microns. Curve 301 is cumulative distribution (% passing), based on volume, Curve 302 is frequency distribution %, based on volume.

In one embodiment, the polyetherimides include a polyetherimide thermoplastic resin composition, comprising: (a) a polyetherimide resin, and (b) a phosphorus-containing stabilizer, in an amount that is effective to increase the melt stability of the poly-etherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere. In one embodiment, the phosphorous-containing stabilizer has a formula P—$R'_a$, where R' is independently H, alkyl, alkoxy, aryl, aryloxy, or oxy substituent and a is 3 or 4. Examples of such suitable stabilized polyetherimides can be found in U.S. Pat. No. 6,001,957, incorporated herein in its entirety.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A process for the manufacture of ultra-fine particles of a high performance polymer in a yield greater than 90%, comprising:
    a. dissolving the high performance polymer in an organic solvent capable of dissolving the polymer to form a solution;
    b. emulsifying the solution by combining the solution with water and a surfactant to form an emulsion;
    c. transferring the emulsion into a receiving water containing a surfactant to remove the organic solvent and form a slurry; and,
    d. recovering particles of <75-micron diameter in a yield greater than 90%;
    wherein the high performance polymer is a polyetherimide.

2. The process according to claim 1, further comprising heating the emulsion up to or below the boiling point of the emulsion before transferring the emulsion into the receiving water.

3. The process according to claim 1, further comprising heating the emulsion above the boiling point of the emulsion before transferring the emulsion into the receiving water.

4. The process according to claim 1, farther comprising transferring the emulsion drop wise into the receiving water.

5. The process according to claim 1, further comprising transferring the emulsion through a nozzle into the receiving water.

6. The process according to claim 1, further comprising transferring the emulsion through a tube into the receiving water.

7. The process according to claim 1, wherein the receiving water is de ionized.

8. The process according to claim 1, further comprising matching the amount of surfactant in the receiving water to the amount of the surfactant in the emulsion.

9. The process according to claim 8, wherein the step of matching raises the yield of particles above 98%.

10. The process according to claim 1, wherein the solvent is a member selected from the group of methylene chloride, chloroform, and combinations thereof.

11. The process according to claim 1, wherein the solvent has a boiling point that is less than 100 C and the solvent is immiscible with water.

12. The process according to claim 1, further comprising agitating the solution of step b. to form the emulsion.

13. The process according to claim 1, further comprising agitating the solution of step b. using a high shear mixer to form the emulsion.

14. The process according to claim 1, further comprising adding a defoaming agent in step c.

15. The process of claim 1, further comprising recovering particles in a yield from about 94% to about 99%.

16. The process of claim 1, wherein the surfactant is anionic surfactant.

17. The process of claim 1, wherein the surfactant is a surfactant selected from the group of sodium dodecyl benzene sulfonate (SDBS), sodium lauryl sulfate, and combinations thereof.

18. The process according to claim 1, further comprising filtering the slurry to form a wet cake.

19. The process according to claim 1, further comprising a course pre-filtering of the slurry to remove any macro particles or contaminates.

20. The process according to claim 18, further comprising washing or re-slurrying the wet cake with de-ionized water.

21. The process according to claim 20, further comprising drying the wet cake under heat and vacuum.

22. A process of forming ultra-fine particles of a polyetherimide (PET) polymer in a yield greater than 90% comprising:
    a. dissolving a polyetherimide (PEI) polymer in a solvent to form a solution, wherein the polyetherimide is soluble in the solvent, the solvent has a boiling point that is less than 100 C and the solvent is immiscible with water;
    b. emulsifying the solution by combining the solution with de-ionized water and a surfactant under agitation conditions sufficient to form an emulsion;
    c. transferring the emulsion into a de-ionized receiving water, the receiving water also containing a surfactant and removing the solvent and form a slurry;
    d pre-filtering the slurry to remove any macro particles or contaminates
    e. filtering the slurry to form a wet cake;
    f. washing or re-slurrying the wet cake with de-ionized water;
    g. drying the washed wet cake under heat and vacuum; and,
    h. recovering particles of polyetherimide (PET) of <75-micron diameter in a yield from about 94% to about 99%.

23. The process of claim 22, wherein the solvent is methylene chloride.

24. The process according to claim 22, further comprising combining a de-foaming agent in step c.

25. The process according to claim 22, further comprising matching the amount of surfactant in the receiving water to the amount of the surfactant in the emulsion.

26. The process according to claim 25, wherein the surfactant is sodium dodecyl benzene sulfonate (SDBS) or sodium dodecyl sulfate (SLS).

27. The process of claim 1, wherein the high performance polymer comprises (a) a polyetherimide resin, and (b) a phosphorus-containing stabilizer, in an amount that is effective to increase the melt stability of the polyetherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere.

28. The process of claim 27, wherein the phosphorous-containing stabilizer has a formula P—R'$_a$, where R' is independently H, alkyl, alkoxy, aryl, aryl oxy, or oxy substituent and a is 3 or 4.

29. The process of claim 22, wherein the polyetherimide polymer comprises (a) a polyetherimide resin, and (b) a phosphorus-containing stabilizer, in an amount that is effective to increase the melt stability of the polyetherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere.

30. The method of claim 29, wherein the phosphorous-containing stabilizer has a formula $P-R'_a$, where R' is independently H, alkyl, alkoxy, aryl, aryloxy, or oxy substituent and a is 3 or 4.

* * * * *